(12) United States Patent  
Flechsig et al.

(10) Patent No.: US 7,298,575 B2
(45) Date of Patent: *Nov. 20, 2007

(54) LOAD/UNLOAD SYSTEMS AND METHODS FOR MAXIMIZING DISK WRITEABLE AREA

(75) Inventors: Karl Arthur Flechsig, Los Gatos, CA (US); Donald Ray Gillis, San Jose, CA (US); Shozo Saegusa, Chiyoda-machi (JP); Reinhard F. Wolter, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/564,208

(22) Filed: Nov. 28, 2006

(65) Prior Publication Data

US 2007/0086107 A1  Apr. 19, 2007

Related U.S. Application Data

(63) Continuation of application No. 10/956,946, filed on Sep. 30, 2004, now Pat. No. 7,154,698, and a continuation of application No. 11/369,291, filed on Mar. 6, 2006, now Pat. No. 7,164,549.

(51) Int. Cl.
  *G11B 21/02* (2006.01)

(52) U.S. Cl. ......................................... 360/75
(58) Field of Classification Search .............. None
  See application file for complete search history.

(56) References Cited

U.S. PATENT DOCUMENTS

| | | | |
|---|---|---|---|
| 6,292,333 B1 * | 9/2001 | Blumentritt et al. ...... 360/254.8 |
| 6,920,009 B2 * | 7/2005 | Xu et al. ........................ 360/75 |
| 7,154,698 B2 * | 12/2006 | Flechsig et al. ............... 360/75 |
| 7,164,549 B2 * | 1/2007 | Flechsig et al. ............... 360/75 |
| 2002/0089776 A1 * | 7/2002 | Hirano et al. .................. 360/75 |
| 2002/0122367 A1 * | 9/2002 | Hirai ........................ 369/53.14 |

* cited by examiner

Primary Examiner—Andrew L. Sniezek
(74) Attorney, Agent, or Firm—Zilka-Kotab, PC

(57) ABSTRACT

A magnetic storage system according to one embodiment includes a magnetic disk having a load zone and a data area; at least one head for reading from and writing to the magnetic disk; and a slider for supporting the head. The load zone is created by: creating a load zone marker on the disk, the load zone marker indicating a position of a load zone of the disk; reading the load zone marker for determining a position of the load zone on the disk; and storing the position of the load zone. The head is loaded on the load zone during subsequent load operations. Methods are also presented.

19 Claims, 3 Drawing Sheets

LOAD/UNLOAD SYSTEMS AND METHODS FOR MAXIMIZING DISK WRITEABLE AREA

RELATED APPLICATIONS

This application is a continuation of U.S. patent application Ser. No. 10/956,946 filed Sep. 30, 2004 now U.S. Pat. No. 7,154,698 and of U.S. patent application Ser. No, 11/369,291 filed Mar. 6, 2006 now U.S. Pat. No. 7,164,549, both of which are incorporated by reference.

FIELD OF THE INVENTION

The present invention relates to hard disk drive load/unload systems and more particularly, this invention relates to systems and methods for controlled load/unload that allows writing along a guard band of the disk.

BACKGROUND OF THE INVENTION

A magnetic disk drive storage device typically comprises one or more thin film magnetic disks, each having at least one data recording surface including a plurality of concentric tracks of magnetically stored data, a spindle motor and spindle motor controller for supporting and rotating the disk(s) at a selected RPM, at least one read/write transducer or "head" per recording surface formed on a slider for reading information from and writing information to the recording surface, a data channel for processing the data read/written, a positionable actuator assembly for supporting the transducer in close proximity to a desired data track, and a servo system for controlling movement of the actuator assembly to position the transducer(s) over the desired track(s).

Each slider is attached on one surface to an actuator arm via a flexible suspension and includes on an opposite side an air bearing surface (ABS) of a desired configuration to provide favorable fly height characteristics. As the disk rotates, an air flow enters the slider's leading edge and flows in the direction of its trailing edge. The air flow generates a positive pressure on the ABS, lifting the slider above the recording surface. The slider is maintained at a nominal fly height over the recording surface by a cushion of air.

As recording density and data transfer rate have increased over the past a few years, critical dimensions in the recording device such as track width read and write gap and coil size have decreased accordingly. Also, the fly height between the air bearing surface (ABS) and the media has become smaller and smaller. For reference, recording heads with 40 GB/in$^2$ products typically have fly heights of about 12 nanometers. Modern heads have even lower fly heights, and fly heights are expected to continue to decrease. This reduction in head critical dimensions and fly height, while beneficial to magnetic performance, also comes with cost on thermal and mechanic reliability. Particularly, with lower fly heights between the head and the magnetic disk during operation of the disk drive, there is an increasing rate of intermittent contacts between the head and the disk resulting in damage to the disk surface and wear on the head elements.

An important issue that arises in designing a hard disk drive relates to head parking which involves placing a head stack assembly in an appropriate position while there is no power applied to the drive. Generally, some type of head parking is needed to avoid problems that result if a spinup operation is initiated while a head contacts any part of a disk surface that defines a data recording zone. In accordance with some designs, each recording surface has a landing zone at which the head for that recording surface is parked. In accordance with other designs, a ramp loading system is provided. According to this design, a ramp is provided for each slider/suspension assembly at the inner or outer diameter of the disk where the slider is "parked" while the spindle motor is powered down. During normal operation, the disk speed is allowed to reach a selected RPM (which may be below the normal operating RPM) before the head is "loaded" onto the disk from the ramp on the air cushion generated by the disk's rotation. In this manner, the slider flies over the disk without significant contact with the disk surface, eliminating contact start/stop wear. The load/unload ramp structure is generally made of plastic which can be injection molded into complex ramp structures.

The teachings of the prior art regarding ramp loading systems leave unresolved various significant technical difficulties with respect to designing a practical system for a high capacity, high performance, high rpm disk drive. In such a drive employing multiple disks in a disk stack, a tight three-way merge tolerance is demanded not only between the disk stack and the head stack, but also between the head stack and the ramp stack, as well as the ramp stack and the disk stack. The z-height variance of a ramp stack itself has to be minimized, while all the ramps have to be precisely machined to a sophisticated ramp profile, made from a thermally stable and wear resistant materials. The disk flutter at the outer diameter is a function of spin rate; thus, higher rpm drives have greater such disk flutter; this further stresses a tight head/disk merge for any outer diameter load/unload system. This, coupled with dramatically increasing linear velocity at the outer diameter, poses severe risk for loading/unloading a head onto a disk. Thus, the load/unload parameters must be designed to assure no damage for the life of the drive, which is very difficult and often unreliable at high disk velocities used in server and desktop class drives.

In addition, because the head is loaded to a random angular position on the disk, a guard band on the disk surface at the inner or outer diameter has to be allocated to loading/unloading so that potential damage does not cause data loss. However, this represents a significant loss to the premium real estate for data recording, on the order of 5-15% of the full writeable area of the disk.

What is therefore needed is a reliable way to obtain more disk capacity by reducing the area of the disk normally not used for data storage because of potential load/unload damage.

SUMMARY OF THE INVENTION

A magnetic storage system according to one embodiment includes a magnetic disk having a load zone and a data area; at least one head for reading from and writing to the magnetic disk; and a slider for supporting the head. The load zone is created by: creating a load zone marker on the disk, the load zone marker indicating a position of a load zone of the disk; reading the load zone marker for determining a position of the load zone on the disk; and storing the position of the load zone. The head is loaded on the load zone during subsequent load operations.

A method for loading a head onto a specified load zone of a disk according to one embodiment includes reading positional index information for determining a position of a load zone of a disk; determining when to load a head based on the positional index information so that the head will load onto the load zone; and loading the head onto the load zone based on the determination. The load zone is created by: writing a load index on the disk for creating a load zone marker on the disk, the load zone marker indicating a position of a load zone of the disk, and correlating positional index information and the load zone marker for determining a position of the load zone on the disk.

A method for creating a load zone of a disk according to yet another embodiment includes writing a load index on a disk for creating a load zone marker on the disk, the load zone marker indicating a position of a load zone of the disk, the load zone having an arc of less than 360 degrees, and correlating positional index information and the load zone marker for determining a position of the load zone on the disk, a head being loaded onto the load zone based on the positional index information.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
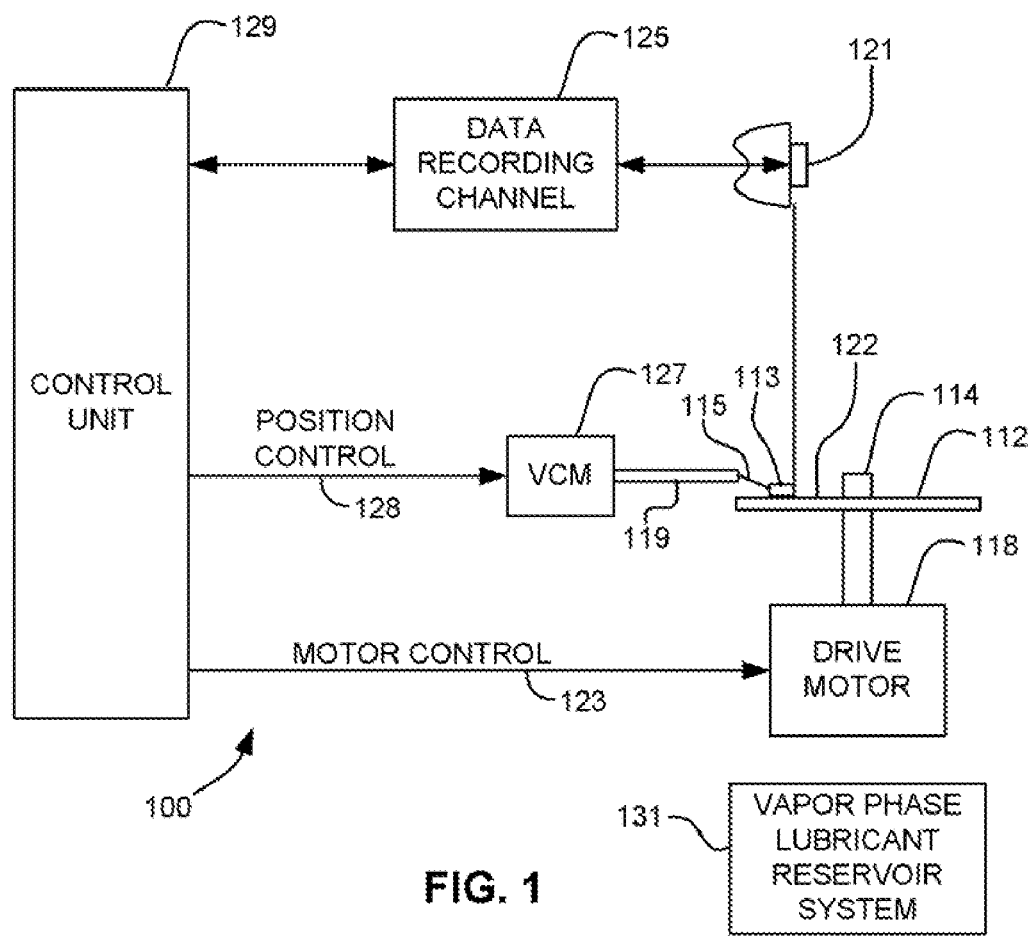
FIG. 1 is a simplified drawing of a magnetic recording disk drive system.

Referring now to FIG. 1, there is shown a disk drive 100 embodying the present invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the disk 112.

At least one slider 113 is positioned near the disk 112, each slider 113 supporting one or more magnetic read/write heads 121. As the disks rotate, slider 113 is moved radially in and out over disk surface 122 so that heads 121 may access different tracks of the disk where desired data are recorded. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements, being controlled by the motor current signals supplied by controller 129.

During operation of the disk storage system, the rotation of disk 112 generates an air bearing between the slider 113 and disk surface 122 which exerts an upward force or lift on the slider. The air bearing thus counter-balances the slight spring force of suspension 115 and supports slider 113 off of and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

Figure 2:
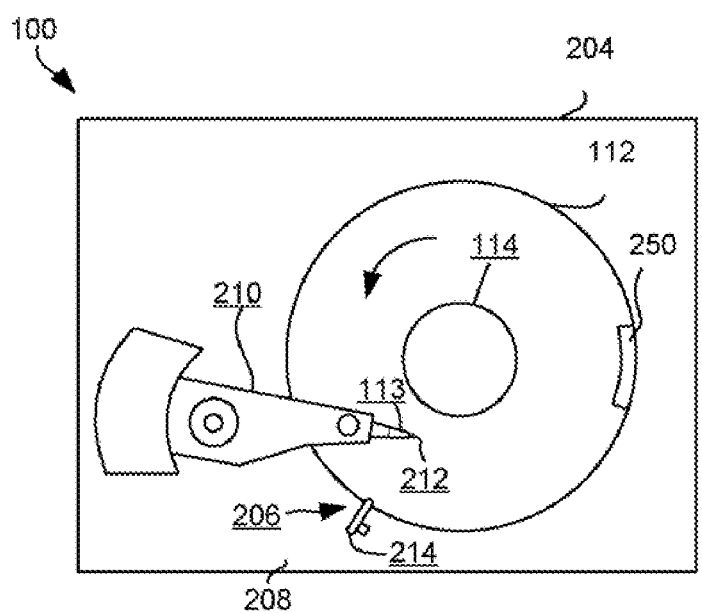
FIG. 2 is a partial top view of the disk drive system of FIG. 1 according to one embodiment of the present invention.

Referring FIG. 2, there is shown a top view of the disk drive 100 of FIG. 1. The disk drive 100 has a disk pack comprising a plurality of stacked thin film magnetic recording disks 112 attached to the spindle 114 enclosed in housing 204. Load/unload structure 206 is fixedly secured to the base plate 208 of the housing 204 of the disk drive at the outer perimeter of disk pack. (Note that an equivalent load/unload structure can be positioned towards the inner perimeter of the disk pack. A rotary actuator assembly comprises a plurality of actuator arms 210 each supporting a slider 113 adjacent to a disk 112. Each actuator arm 210 suitably has a protrusion or tab 212 at its distal end for engaging a ramp 214 of the load/unload structure 206 during load/unload operations.

The above description of a typical magnetic disk storage system, and the accompanying illustration of FIGS. 1 and 2 are for representation purposes only. It should be apparent that disk storage systems may contain a large number of disks and actuators, and each actuator may support a number of sliders.

As mentioned above, prior art load/unload systems do not load the head onto data because the load area s random each time the drive is initiated, and the potential for data loss exists each time the head is loaded. Thus, the entire guard band in such systems is empty. The present invention improves drive reliability by providing a dedicated load/unload zone 250 on the disk 112, as shown in FIG. 2. The present invention also improves disk drive format efficiency by reducing the area of the disk normally not used for data storage because of potential load/unload damage.

Figure 3:
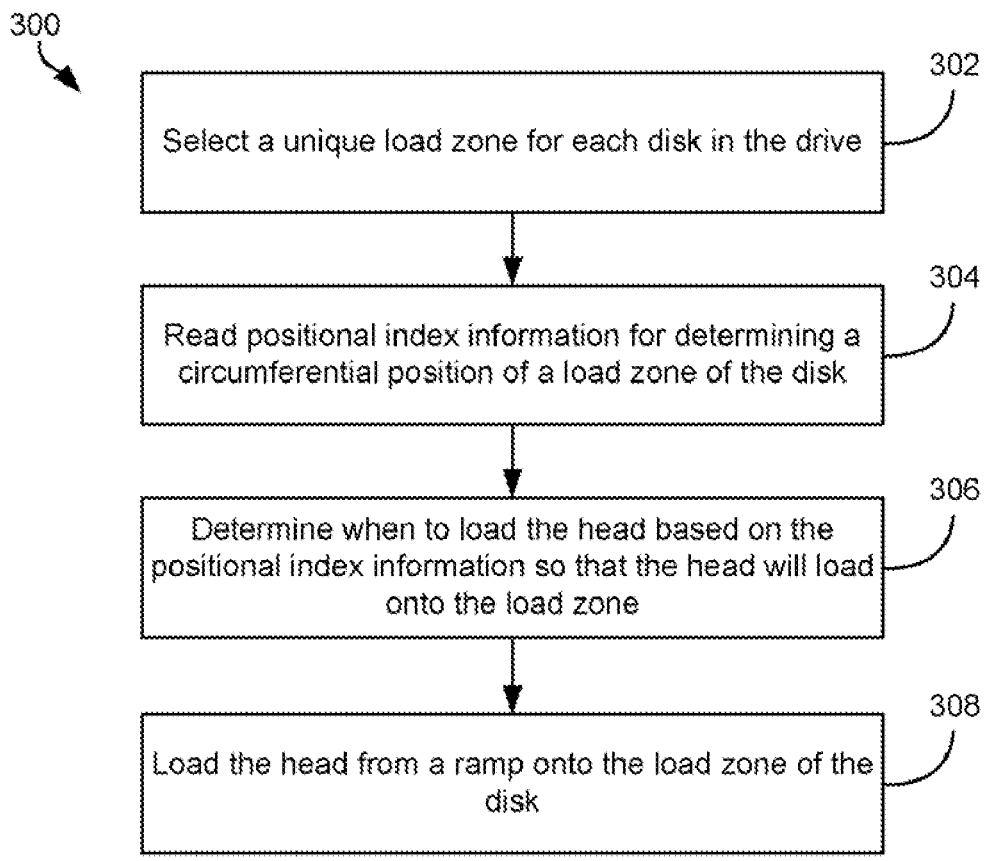
FIG. 3 is a flow diagram of a general method for loading a head onto a specified load zone on a disk.

FIG. 3 illustrates a general method 300 for loading a head onto a specified load zone on the disk. In operation 302, a unique load zone is selected for each disk in the drive, preferably towards the inner or outer periphery of the disk. In operation 304, positional index information is read for determining a circumferential position of a load zone of a disk. In operation 306, when to load the head is determined based on the positional index information so that the head will load onto the load zone, the load zone having an arc of less than 360 degrees. In operation 308, the head is loaded from a ramp onto the load zone of the disk. The rest of the circumference (normally not used because of the normally random load/unload area) is available for data storage. More information about each of these operations will now be presented.

The simplest way to select and create a load zone is to pre-specify one certain area of the disk as the load zone. The positional information is stored in the drive so that each time the head is loaded, it will load on the specified load zone.

Another way to create the load zone is by writing data while loading the head during the file manufacturing process (synchronized to a spindle index), and then using this index to deallocate a small buffer zone around where the head loads. The rest of the circumference (normally not used because of the normally random load/unload area) is available for data storage.

Figure 4:
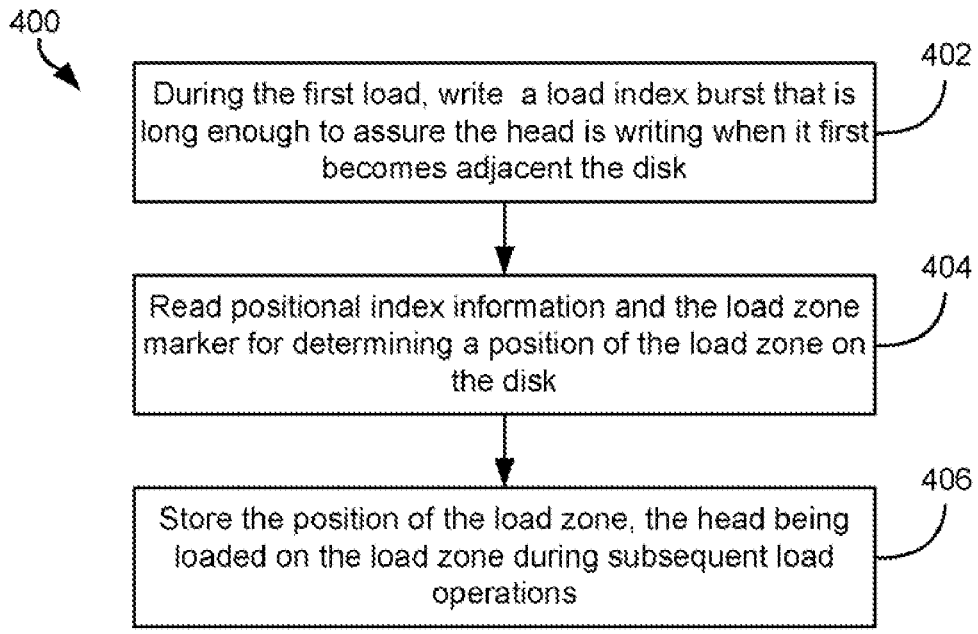
FIG. 4 is a flow diagram of a method for creating a load zone on a disk.

FIG. 4 illustrates such a method 400. In operation 402, during the first load during the servo write operation, the head writes a load index burst that is long enough to assure the head is writing when it first becomes adjacent the disk. The burst writes a load index to the disk, thereby creating a readable load zone marker. The load position, which is indexed from disk rotation, will be consistent within perhaps 20-30 degrees of disk rotation. The reason that this is consistent is that the major cause for load zone uncertainty in the circumferential direction, is disk runout. However, disk runout is mostly repeatable, and so the resultant load zone will be repeatable. Since this can be performed for each head in a file sequentially, a unique load index can be determined for each head in a file.

In operation 404, to find the repeatable load zone, the head merely has to read back the load write burst (load zone marker) that was previously written during the first load and correlate it to the positional index information, thereby determining an index to the load zone that will be used as a load zone. In operation 406, the position of the load zone, correlated with the positional index information, is stored, so that the actual load (and unload) always occurs in the load zone. The remaining 330-340 degrees that in prior designs have not been used for data because of potential damage causing data loss, is now useable. This method 400 can be repeated individually for each disk in the drive.

The load zone is preferably selected in region that is least likely to cause physical damage to the head. Such a region is a down-slope of the disk. The disk will have a certain waviness resulting from clamping the disk to the spindle, the waviness having up and down slopes as viewed from a stationary position coplanar to the disk. By loading the head at the top of a wave, the head can follow the slope of the disk downwardly, allowing more time for the air bearing between the disk and head to be created.

To ensure that the head loads in the loading zone, a positional index can be added to the system that indicates angular position of the disk. By reading the positional index information, the position of the load zone can be determined and the head loaded at the appropriate position, i.e., on the load zone. Because the load/unload operation is controlled by the servo, the time for the head to exit the ramp is very predictable.

One method for creating the positional index is by adding an optical sensor to the system that recognizes features such as a line or spot on the disk or spindle as it rotates. A laser or other light source and corresponding optical sensor detect the feature by detecting a change in reflectivity. Because the location of the feature is known, and the angular velocity of the disk calculatable, the position of the load zone can be readily determined.

Another method for creating, the positional index is by using a magnetic sensor that detects a magnet rotating on the motor or spindle.

Yet another method for creating the positional index is by reading motor coil timing. In this embodiment, back electromotive force (EMF) is used to read the position of motor, and accordingly, the disk. Note that in this situation, if the motor has multiple poles, a load zone for each pole can be provided. For instance, if the motor has three identical poles, the system can determine when it is at one of the three poles, and can instruct the head to load on one of three load zones.

One skilled in the art will appreciate that other means of indexing can also be used.

As mentioned above, because the head always loads in the load zone, the load zone can be m asked or otherwise marked as unwritable, and data can be written in an area of the disk circumferential to the load zone but not including the load zone. Depending on the system, and the anticipated repeatability of landing in the load zone, the arc of the load zone can be made anywhere from less than 360 degrees down to about 15 degrees. The load zone 250 shown in FIG. 2 is less than about 30 degrees.

The data area gained is inversely proportional to the size of the disk and proportional to the size of the slider. On a 65 mm disc, for example, about 7% of data capacity can be added per side of the disk. On 1.5 inch microdrives, the data gain is more pronounced, on the order of 12% or more. Thus, the inventors expect to gain an additional 3-15% of data area.

It is also possible to use the load zone as a data area, though there is still a theoretical risk that the head could strike the disk. In this embodiment, the load zone is preferably selected in region that is least likely to cause damage to data as well as physical damage to the head. Again, the head cab be made to load such that it follows a downslope of the disk.

Figure 5:
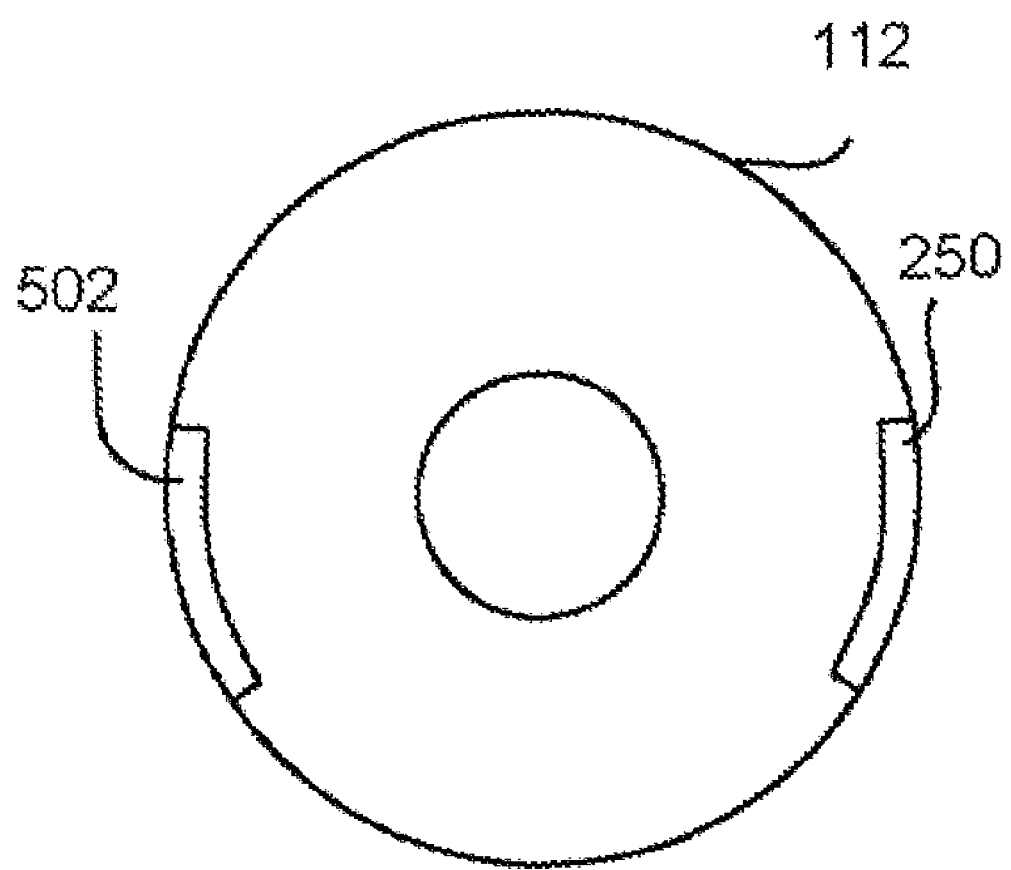
FIG. 5 is a side view of a disk according to one embodiment.

To ensure that the data is secure, it can be replicated on another part of the disk for reliability, as shown in FIG. 5. To maximize space, the data 502 is preferably written to an area of the disk that is co-circumferential with the load zone 250. For example, the data can be replicated at a certain phase offset, such as at a 180 degree phase.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic storage system, comprising:
   a magnetic disk having a load zone and a data area;
   at least one head for reading from and writing to the magnetic disk; and
   a slider for supporting the head;
   wherein the load zone is created by:
      creating a load zone marker on the disk, the load zone marker indicating a position of a load zone of the disk;
      reading the load zone marker for determining a position of the load zone on the disk; and
      storing the position of the load zone,
   wherein the head is loaded on the load zone during subsequent load operations.

2. The system as recited in claim 1, wherein the load zone is positioned towards an outer periphery of the disk.

3. The system as recited in claim 1, wherein the load zone is positioned towards an inner periphery of the disk.

4. The system as recited in claim 1, wherein the load zone has an arc of less than about 180 degrees.

5. The system as recited in claim 1, wherein the load zone has an arc of less than about 90 degrees.

6. The system as recited in claim 1, wherein the load zone has an arc of less than about 30 degrees.

7. The system as recited in claim 1, wherein data is written in an area of the disk co-circumferential to the load zone but not including the load zone.

8. The system as recited in claim 1, wherein data is written in the load zone, the data being replicated in another area of the disk not in the load zone.

9. The system as recited in claim 8, wherein the other area of the disk is co-circumferential to the load zone.

10. The system as recited in claim 1, wherein the load zone has been selected at random.

11. A method for loading a head onto a specified load zone of a disk, comprising:
    reading positional index information for determining a position of a load zone of a disk;
    determining when to load a head based on the positional index information so that the head will load onto the load zone; and
    loading the head onto the load zone based on the determination,
    wherein the load zone is created by:
    writing a load index on the disk for creating a load zone marker on the disk, the load zone marker indicating a position of a load zone of the disk, and
    correlating positional index information and the load zone marker for determining a position of the load zone on the disk.

12. The system as recited in claim 11, wherein the load zone is positioned towards an outer periphery of the disk.

13. The system as recited in claim 11, wherein the load zone is positioned towards an inner periphery of the disk.

14. The method as recited in claim 11, wherein the load zone has an arc of less than 360 degrees.

15. The method as recited in claim 11, wherein data is written in an area of the disk co-circumferential to the load zone but not including the load zone.

16. The method as recited in claim 11, wherein data is written in the load zone, the data being replicated in another area of the disk.

17. The method as recited in claim 16, wherein the other area of the disk is co-circumferential to the load zone.

18. The method as recited in claim 11, wherein the method is performed for each disk in a drive.

19. A method for creating a load zone of a disk, comprising:
    writing a load index on a disk for creating a load zone marker on the disk, the load zone marker indicating a position of a load zone of the disk, the load zone having an arc of less than 360 degrees, and
    correlating positional index information and the load zone marker for determining a position of the load zone on the disk, a head being loaded onto the load zone based on the positional index information.

* * * * *